March 22, 1932.  L. PAROSELLI  1,850,153
STEREOSCOPE
Filed June 11, 1929  2 Sheets-Sheet 1
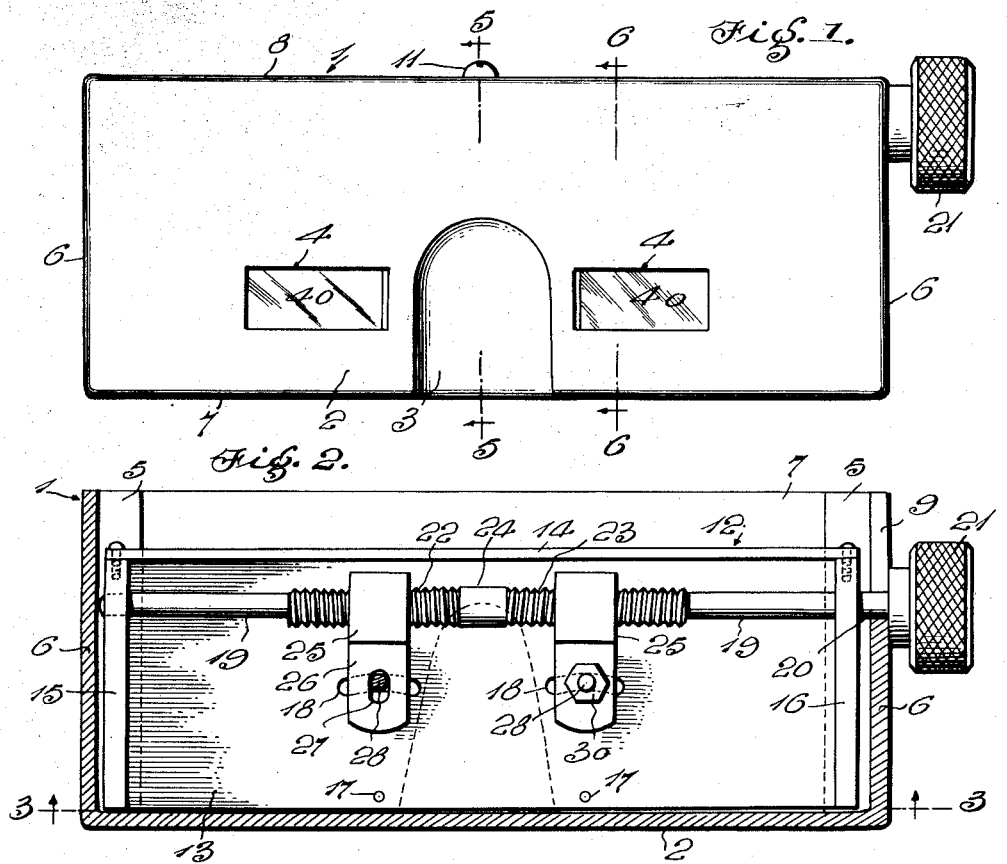
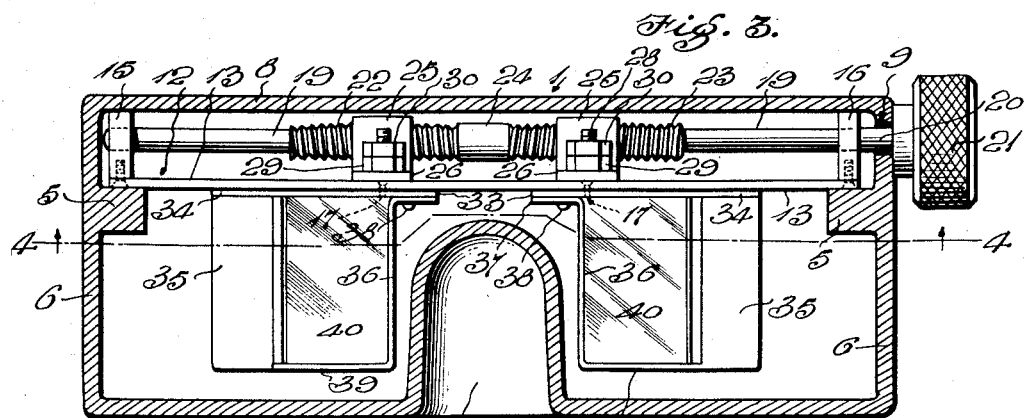
Leopold Paroselli
Inventor
Attorney March 22, 1932. L. PAROSELLI 1,850,153
STEREOSCOPE
Filed June 11, 1929 2 Sheets-Sheet 2
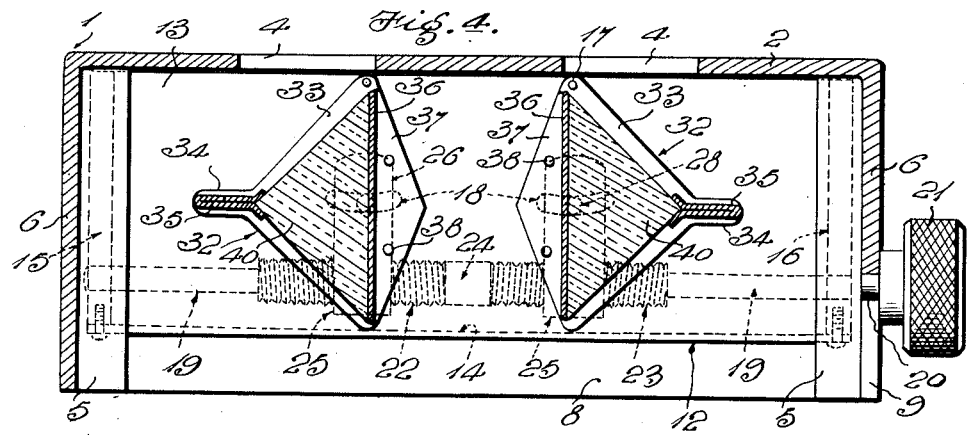
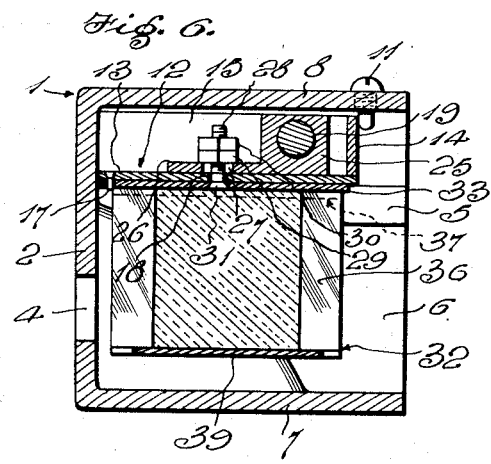
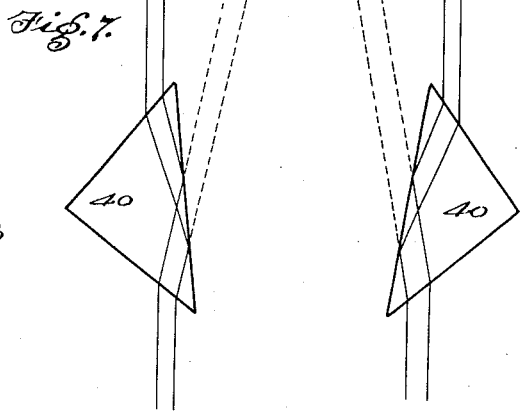
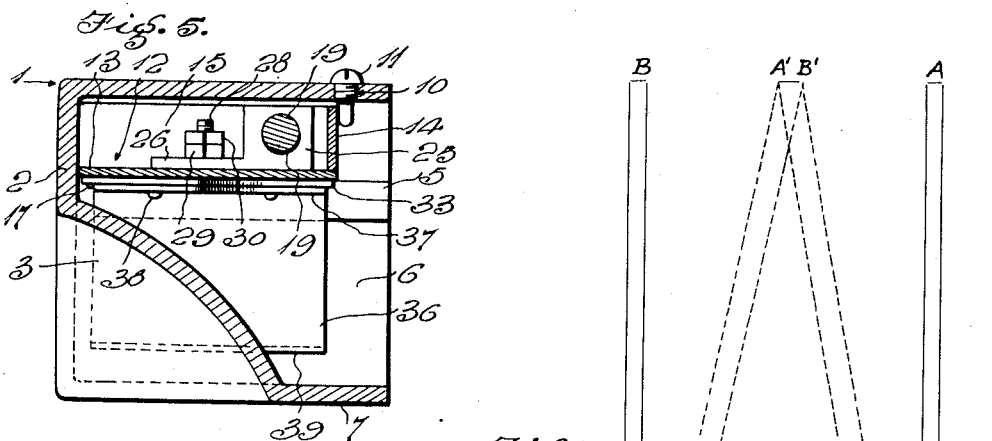
Leopold Paroselli
Inventor
By Elmer Stuart
Attorney Patented Mar. 22, 1932

1,850,153

UNITED STATES PATENT OFFICE

LEOPOLD PAROSELLI, OF JERSEY CITY, NEW JERSEY

STEREOSCOPE

Application filed June 11, 1929. Serial No. 370,122.

My invention relates to improvements in stereoscopes intended for use in the production of stereoscopic pictures. It is recognized that devices of this type must be reduced to simplest form, and lightest weight for use of manipulation. At the same time the prisms must be readily adjustable to insure accurate apparent coincidence of the images.

It is an object of this invention to provide a light but substantial casing for these devices and to assemble therein an improved stereoscopic unit of the above type.

It is a further object of the invention to mount the two prisms in identical manner so that both may be adjusted in focusing.

The act of focusing is carried out, according to this invention, by the use of a single operating means of improved design connected with both prisms.

Other advantages and improvements in general arrangement and specific details will be apparent from the following description of the preferred form of my invention as illustrated in the accompanying drawings in which, Fig. 1 is a side elevation of the stereoscope;

Fig. 2 is a plan view with the top broken away;

Fig. 3 is a vertical section on the line 3—3 of Fig. 2;

Fig. 4 is a horizontal section on the line 4—4 of Fig. 3 and looking upwardly;

Fig. 5 is a transverse vertical section on the line 5—5 of Fig. 1;

Fig. 6 is a similar transverse vertical section on the line 6—6 of Fig. 1 and

Fig. 7 is a diagram illustrating the action of the prisms.

The invention is shown as consisting of a casing of compact dimensions containing a pair of prisms so mounted on a removable supporting member that they may be adjusted simultaneously by a common means outside of the casing. The casing 1, may be of any convenient form or material but has been illustrated by way of example as formed by an integral metallic casting of aluminum or the like. One side wall 2 of the casing has a channel or recess 3 intersecting the edge of the casing and the bottom as well. This channel is of convenient size to receive the bridge of the nose of the person using the stereoscope. In the side wall of the casing and appropriately spaced on each side of the channel 3 is an aperture 4, which is opposite the eye of the operator and transmit the light rays from the object observed.

The opposite side of the casing has been shown open although the invention permits of a side wall or partition being used to cover the device when desired.

Ledges 5, 5 are cast or otherwise mounted on the inner sides of the end walls 6, 6 and run parallel to the bottom 7 and top 8. One end wall is slotted as at 9 to permit the insertion of an operating shaft. Through the top 8 there is a threaded hole 10 which receives a locking bolt 11.

The ledges 5, 5 form slides or guides for receiving and holding a supporting member denoted generally by the numeral 12. This member has a bottom plate 13, a front 14 and end walls 15 and 16. The member forms a support for the prism holders and the associated operating means. For this purpose the plate has pins 17, 17 projecting below the surface of the plate as shown in Figs. 3 and 6 and serving as pivots for the prism holders. The plate is also slotted at 18, 18 in arcs around 17, 17 as centers so that the prism holders may be freely pivoted around 17, 17 respectively from the upper side of the plate 13.

End walls 15 and 16 are apertured to form journals for an operating shaft 19. This shaft has one projecting end 20 on which is attached a knurled nut 21 to facilitate operation. The end 20 projects through the slot 9 in the end wall 6 as shown in Figs. 2 and 4 with the nut 21 outside the casing.

The shaft 19 has a right-hand thread 22 and a left hand thread 23 meeting at a center portion 24 and extending outwardly toward the end walls of the supporting member.

On each threaded section of the shaft 19 there is carried a similarly threaded traveler or collar 25, 25. These travelers have extended bases 26, 26 which are slotted as at 27. A threaded bolt 28 is held in each apertured 27 by a nut 29 and lock nut 30. The enlarged countersunk head 31 of the bolt 28 extends beneath the plate 13 to suspend the prism holder.

The prism holders 32 consist of base plates 33 of generally tetragonal shape as shown in Fig. 4. One angle is extended as at 34 and supports an angle bar 35 having a recess perpendicular to plate 33. A back-plate 36 is held against the opposite sides of the plate 33 by means of a flange 37 and screws 38 or the like. The lower end of back-plate 36 is bent into a plane parallel to plate 33 and extends as bottom 39 substantially to the angle bar 35. As shown in Fig. 6 the head 31 of bolt 28 is received within the plate 33.

The prism holder 32 has one corner apertured to receive the pivot pin 17. Prior to assembly of the prism holder it is fitted with a prism 40 of optical glass which has one edge held in the recess of angle bar 35 while the opposite side is against the back-plate 36 with the bottom and top in contact with 39 and 33 respectively.

The prism holders are assembled with the supporting member by bringing the bolts 28 through the intersecting slots 18 of the plate 13 and slots 27 of bases 26 respectively. The lock nuts are then tightened to hold the prism holders up near the under side of plate 13 but free to move around pivot pins 17.

The supporting member is then slid along the ledges 5, 5, until the member is against wall 2 with the prisms opposite the apertures 4, 4. This brings the adjusting nut 21 outside the casing. The devices are maintained in this position by the locking bolt 11 or equivalent device. An apertured partition for this side of the casing may serve the same purpose.

It will be apparent that movement of the adjusting nut 21 will rotate the prisms simultaneously about the pins 17 and in reverse directions. This will result in prompt and accurate adjustment of the images A' B' into desired coincidence as shown in the diagram Fig. 7.

A stereoscope made according to the above arrangement provides a light, rigid frame quite easy to hold and operate. The location of the pivot for the prism on the edge nearest the eye permits the desired focusing without disturbance to the position of the eyes. The mechanism for making the adjustment is simple and efficient and is operable by one hand only.

Many changes in specific structural details and minor proportions will suggest themselves to one skilled in this art as being within the scope of the invention as set forth in the following claims.

What I claim is:

1. In combination, a supporting member, two spaced pivots on said member, a revoluble shaft journaled on said member, said shaft having right and left threaded portions, a traveler on each threaded portion, a pair of prisms, a holder for each prism, and means for attaching a holder to a traveler and for drawing the holder into operative engagement with one of said pivots.

2. In combination, a supporting member having slots, two spaced pivots on one side of said member, a revoluble shaft journaled in spaced relation to the opposite side of said member, said shaft having right and left threaded portions, a traveler on each threaded portion and overlying a slot in said supporting member, a pair of prisms, a holder for each prism and means passing through the slots for attaching a holder to a traveler and for drawing the holder into operative engagement with one of said pivots.

3. In combination, a supporting member, a pair of prisms, a holder for each prism, each holder being pivoted at one point on said supporting member, a stud on each holder, an adjusting shaft journaled on the supporting member, right and left threads on the shaft, a traveler on each thread, each of said travelers engaging the stud on one holder and means on the said stud for drawing the holder into engagement with said pivot.

4. In combination, a casing having a rear wall open to light, spaced openings in the opposite wall for parallel beams of light, a supporting member within the casing, a pair of prisms, a holder for each prism, means on the supporting member for pivoting each holder along one edge of the prism, and means for simultaneously moving the holders around said pivots.

In testimony whereof, I affix my signature.

LEOPOLD PAROSELLI.